June 13, 1967 F. R. GRIMM 3,324,940
THERMAL CONTROL MECHANISM

Filed Oct. 9, 1963 3 Sheets-Sheet 1

INVENTOR.
FORREST R. GRIMM
BY Robert B. Hughes

ATTORNEY

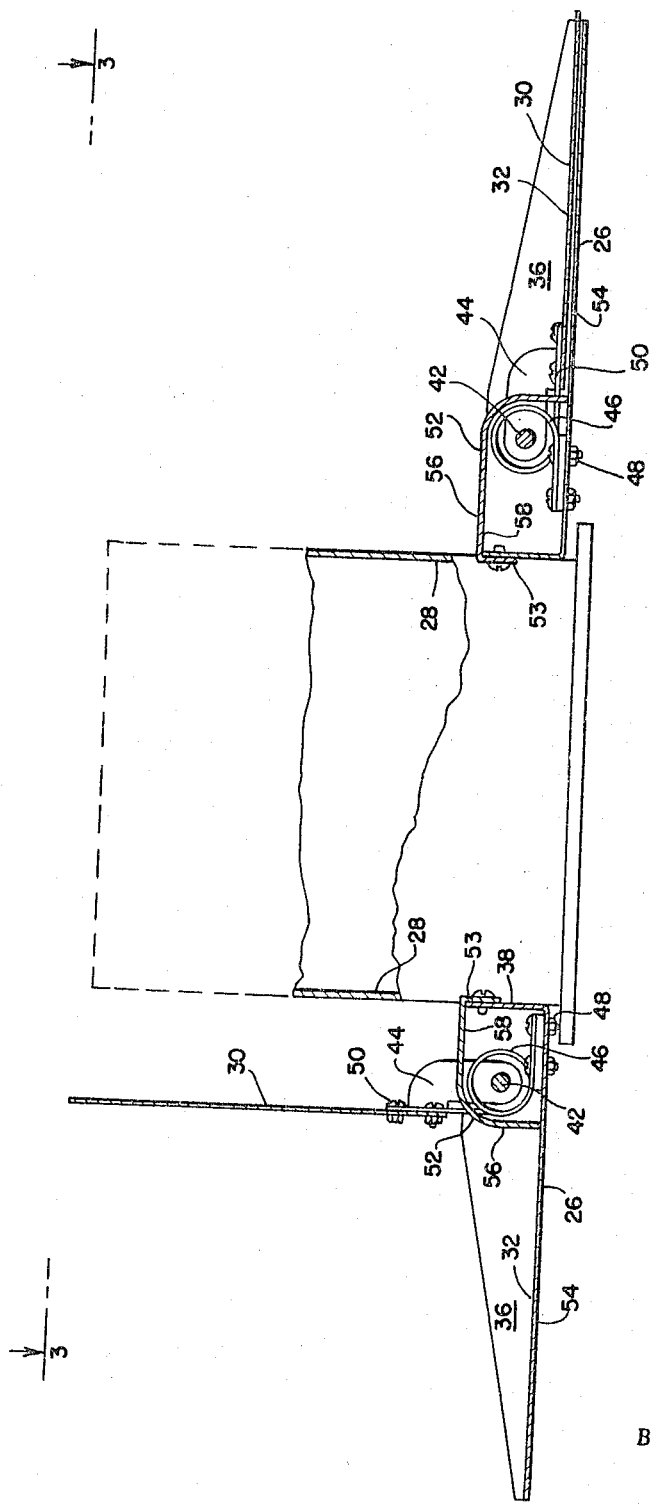

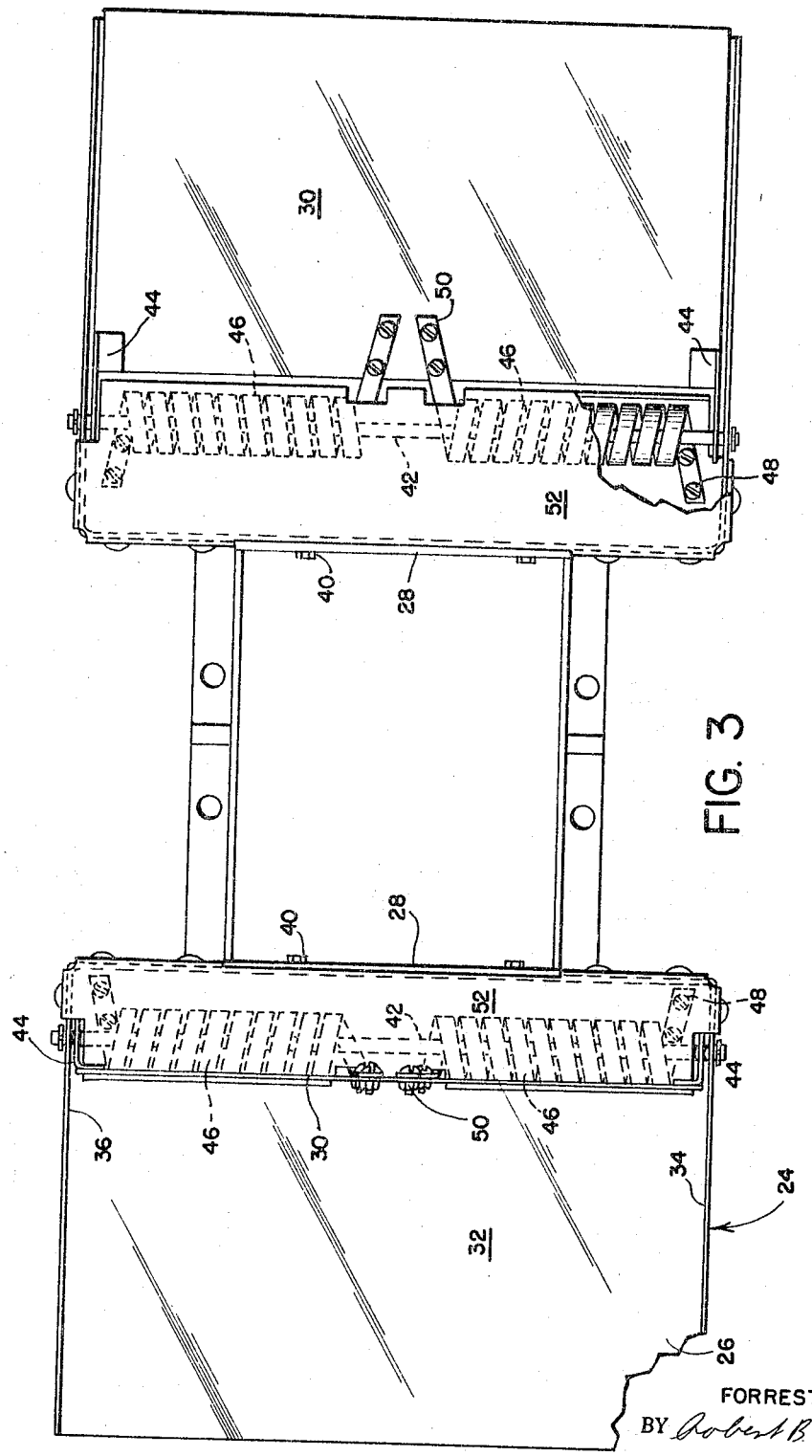

— 
United States Patent Office 3,324,940
Patented June 13, 1967

3,324,940
THERMAL CONTROL MECHANISM
Forrest R. Grimm, Minneapolis, Minn., assignor to General Mills, Inc., a corporation of Delaware
Filed Oct. 9, 1963, Ser. No. 315,032
10 Claims. (Cl. 165—133)

The invention described herein was made in the performance of work under a NASA contract and is subject to the provisions of the National Aeronautics and Space Act of 1958, Public Law 85–568 (72 Stat. 426; 42 U.S.C. 2451), as amended.

This invention relates to a thermal control mechanism and process, and more particularly to such a mechanism and process for moderating the temperature of an associated device in an environment where there are wide variations in the rate at which heat is radiated to the device, such as the environment which exists on the moon's surface.

The apparatus of the present invention was specifically designed for use in conjunction with a lunar television camera manipulator. One of the problems of operating such a lunar manipulator is that the temperature of material at the moon's surface (since the moon has no atmosphere, it is meaningless to think in terms of any "ambient" temperature) will rise to as high as possibly plus 250 degrees Fahrenheit during the lunar day and drop to possibly minus 100 degrees Fahrenheit during the lunar night.

During the lunar day, a manipulator on the moon's surface will be receiving radiant energy both from the sun and from the moon's surface, and will be radiating away energy to the moon's surface and out into space. During the lunar night, less radiant heat will be received from the moon's surface (because of its reduced temperature) and substantially no radiant energy will be received from bodies beyond the moon's surface. Depending on the manner in which the manipulator is mounted on the moon's surface, there will be a certain amount of conduction (probably minimal) between the moon's surface material and the manipulator (assuming that there is a temperature difference therebetween), and of course with no atmosphere on the moon there is no heat transfer due to convection, condensation, etc., from a surrounding atmosphere as we experience on the earth. Thus to moderate the temperature of the manipulator it is desirable that during the lunar day, the apparatus be such as to minimize the absorption of radiant energy and maximize the emission thereof, and during the lunar night to retain as much of the energy received during the lunar day and retain whatever heat energy the manipulator itself may generate.

For practical reasons relating to the difficulties of landing a pay load on the moon and also to the severe operating conditions on the moon (i.e. equipment experiencing large temperature differences and operating in what amounts to a complete vacuum), the design requirements for any lunar equipment will necessarily be quite stringent. Thus careful regard must be given to such factors as weight, simplicity and reliability of operation, freedom from maintenance, ability to operate in a vacuum and under wide temperature variaions, some degree of ruggedness, etc.

Thus it is an object of the present invention to provide an improved thermal control mechanism and process especially adapted for operation in an environment such as that which exists on the moon's surface.

It may be stated as a more particular object to provide such a thermal control mechanism and process which furnishes an associated device (such as a manipulator or a vehicle, etc.) with a heat emissive means arranged to function during the lunar day to receive heat energy from the device and dissipate this as radiant energy, while minimizing the absorption of radiant energy, and during the lunar night to substantially reduce the emission of radiant energy so as to increase the retention of heat energy by the associated device.

It is a further object to provide in such apparatus and process improved heat responsive means to control the operation of the heat emissive means.

These and other objects and features of the invention will be more readily understood and appreciated from the following detailed description of the preferred embodiments thereof selected for purposes of illustration and shown in the accompanying drawings, in which:

FIGURE 2 is a sectional view of the thermal control apparatus of the present invention, taken in vertical section along a plane generally coinciding with the front surface of the manipulator base; and FIGURE 3 is a top plan view of the thermal control apparatus of the present invention taken generally on line 3—3 of FIGURE 2.

Figure 1:
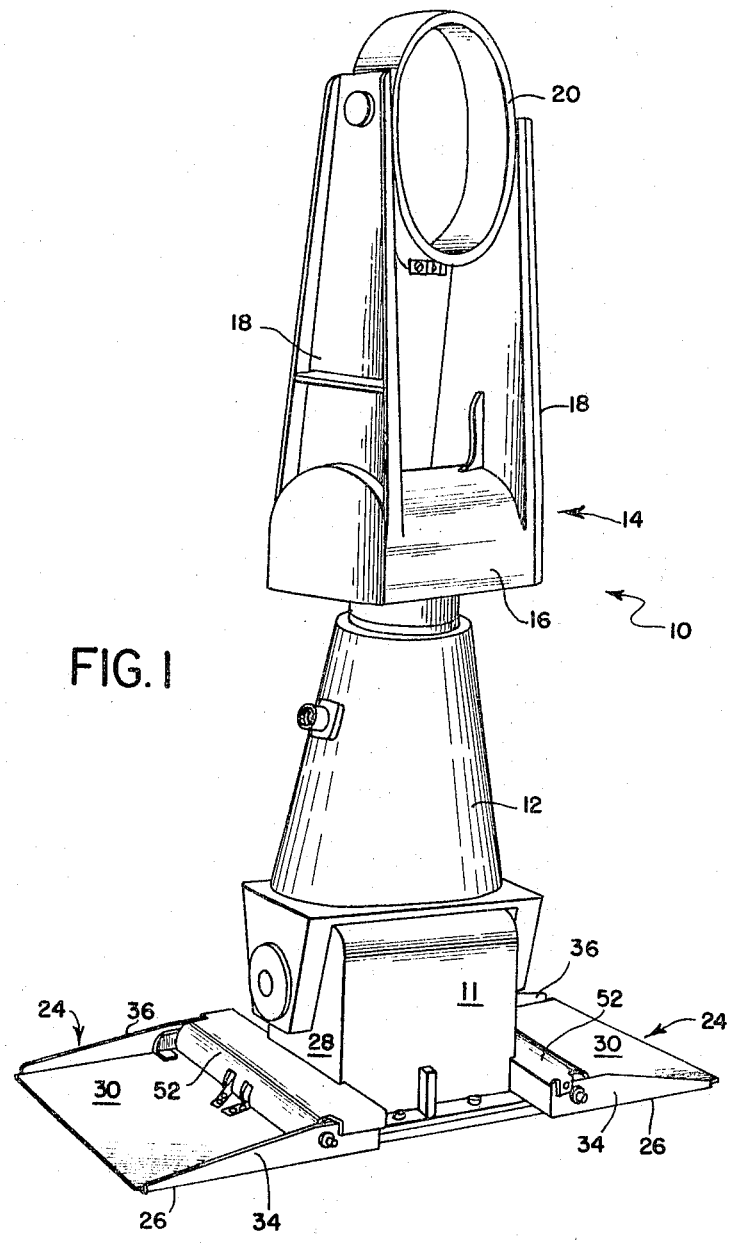
FIGURE 1 is a perspective view of the camera manipulating assembly furnished with the apparatus of the present invention.

Referring to the accompanying drawings, it can be seen that the lunar TV camera manipulating assembly 10 for which the present invention is adapted comprises a base member 11, above which a boom 12 is mounted for swing motion about a horizontal axis. At the upper or outer end of the boom 12 a mounting yoke 14 is journal mounted by the shoulder portion 16 thereof for rotary motion about an axis coincident with the longitudinal axis of the boom 12. This yoke 14 has a pair of upstanding arms 18 between which a camera mounting ring 20 is mounted for rotary movement about an axis perpendicular to the rotary axis of the yoke 14. Thus by swinging the boom 12 and turning the ring 20 and/or the yoke 14 through suitable power and control means, the camera (not shown) mounted in the ring 20 can be made to face in any direction, and by swinging the boom 12 with respect to the base 11 the camera can be swung in an arc of about 180° about the swing axis of the boom 12 so as to change both its elevation and its lateral position.

The thermal control apparatus, generally designated 24, comprises two portions, each of which comprises a planar horizontally disposed radiating plate 26 fixedly mounted to a respective side wall 28 of the base 11 of the camera manipulator 10 so as to extend laterally therefrom, and a planar shield 30 having generally the same configuration as its respective plate 26. Each shield 30 is swing mounted from its respective plate 26 and is movable (by means to be described hereinafter) between an upright position by which the upper radiating surface 32 of its respective plate 26 is exposed, and a second heat retaining position wherein the shield 30 closely overlies the plate 26 so as to conceal the radiating surface 32 thereof. In actual operation, both shields 30 will generally be in a same operating position (i.e. during the lunar day the shields 30 will be upright, while during the lunar night, the shields 30 will be covering the radiating surfaces 32 of their respective plates 26). However, to illustrate both operating positions of the shields 30, in FIGURES 2 and 3 the right hand shield 30 is shown in its horizontal heat retaining position, while the left shield 30 is shown in its upright position.

Each of the radating plates 26 is provided with a front and rear stiffening rib 34 and 36, respectively, and at its inner edge is formed with an integral upstanding flange 38 by which it is secured, as by bolts 40, to its respective side wall 28 of the manipulator base 11. The plate 26 and its mounting flange 38 are made of copper (which is, of course, a good conductor of heat) and the flange 38 is in contact with the base side wall 28 along a reasonably large area so that there is good heat conduction from the manipulator base 11 to the radiating plates 26.

Each of the shields 30 is conveniently mounted about a longitudinal swing axis proximate the inner edge of its related radiating plate 26 by means of a shaft 42 mounted to its respective front and rear ribs 34 and 36, each shield 30 being provided at its inner portion with suitable mounting brackets 44 for this purpose. The position of each shield 30 is controlled by a respective pair of bimetal elements 46, each of which is secured by one end at 48 to its related radiating plate 26 and by the other end at 50 to its related shield 30. The main body of each bimetal element 46 is formed as a helix, the center axis of which is coincident with its related mounting shaft 42.

Each pair of bimetal elements 46 is provided with a respective cover 52 which shields the bimetal elements 46 from the direct rays of the sun. So that there is good heat conduction from the manipulator base 11 to each of these two covers 52 (for reasons to be disclosed hereinafter), each cover 52 is made of copper and is mounted by flanges 53 formed integrally therewith to the mounting flange 38 of its related plate 26, and makes contact over a moderately large area with its flange 38, which in turn, as previously mentioned, makes good heat conductive contact with the manipulator base 11.

Except for the radiating surfaces 32 of the plates 26, all the exposed surfaces of both the camera manipulating assembly 10 and the thermal control mechanism 24 have polished metal surfaces, desirably of gold. Thus both surfaces of each of the shields 30 are polished gold, as is the lower surface 54 of each of the two radiating plates 26 and the exposed surfaces 56 of the bimetal covers 52. The upper radiating surface 32 of each of the plates 26 is coated with a white substance, desirably a durable porcelain-like material.

The bimetal elements 46 are so arranged that during the lunar day when the bimetal elements 46 are at an elevated temperature, the shields 30 are upright, and the white radiating surfaces 32, which face upwardly, are exposed to the sun's rays. However, during the lunar night the bimetal elements 46 cool and move each of the shields 30 down over the radiating surface 32 of its respective plate 26 so that both radiating surfaces 32 are completely covered.

Thus it can be seen that during the lunar day, a substantial area of white surface is exposed to the sun's rays, but being disposed upwardlly, the white surface area 32 is not exposed to any substantial radiation from the material at the moon's surface. The bottom surface 54 of each of the radiating plates 26 is exposed substantially only to radiation from the moon's surface, while the rest of the thermal control mechanism 24 and the manipulating assembly 10 is exposed generally to radiation from both the sun and the moon's surface.

Although a polished metal surface (especially a gold surface is a poor absorber and emitter of heat radiation from a hot source, it is also a very poor emitter and absorber of heat radiation from low temperature source. Hence, even though a body having a polished metal surface has a low rate of net heat absorption, it will eventually reach an undesirably high equilibrium temperature when it is exposed to solar radiation and cannot dissipate (as by conduction) the heat energy it accumulates. However, in the present instance, heat absorbed by the manipulating assembly 10 is conducted through the side walls 28 of the manipulator base 11 to the radiating plates 26. This heat energy is then dissipated by radiation through the white radiating surfaces 32 of the plates 26.

While it is true that radiation from the sun is bearing on the white radiating surfaces 32, the sun is at a very high temperature, and hence radiation of shorter wave length predominates in this solar radiation. While a white surface is a fair emitter and absorber of heat radiation from a more moderate temperature source, a white surface is a relatively poor emitter and absorber of radiation from a relatively hot source. Hence, since the temperature of the plates 26 would normally be in a more moderate range (not more than perhaps 400° Fahrenheit), heat is dissipated at a reasonably high rate from the radiating surfaces 32, while heat radiation is absorbed at a relatively low rate by these surfaces 32.

During the lunar night, when the radiating surfaces 32 of the plates 26 are covered by the shields 30, any radiation emitted from the surfaces 32 strikes the surfaces of the shields 30 and is immediately reflected back into the plates 36. In effect, the entire manipulating assembly 10 and the thermal control mechanism 24 have only exposed surfaces of polished gold, which, at lower temperatures, is a notoriously poor emitter and absorber of radiant heat. The effect is that the heat energy contained in the manipulator 10 is dissipated at a very slow rate during the lunar night.

The inwardly directed or unexposed face 58 of each cover 52 has a rough dull surface which radiates heat rapidly toward its associated pair of bimetal elements 46, each of which also has a rough dull surface. Thus when the base 11 of the manipulator rises in temperature, heat from the base 11 is conducted through each flange 38 to each cover 52 which in turn rapidly radiates heat toward its respective pair of bimetal elements 46. Likewise when the base 11 cools, if the bimetal elements 46 are at a higher temperature than the base 11, heat is rapidly radiated from the bimetal elements 46 to the covers 52 and conducted to the base 11. Thus the bimetal elements 46 are made quite responsive to temperature changes in the manipulator base 11 so that the shields 30 are raised or lowered in proper response to the temperature of the base 11 of the manipulator 10. Since the exposed surfaces 56 of the covers 52 are of polished gold, for the reasons hereinbefore stated, the radiation of the sun falling directly on the covers 52 has relatively little effect on the bimetal elements 46 as compared to the effect of its heat transfer to and from the manipulator base 11.

It should be indicated that as shown herein, the plates 26 serve only a heat dissipating function. However, in other applications, these plates 26 could serve some additional function, such as a support function, or could be a cover member for an associated apparatus. Also the shields 30 could serve some additional function other than that indicated herein. However, the radiating surface or surfaces selected should be disposed upwardly, so as to be shielded from radiation from the moon's surface, but be exposed to radiation from and be able to emit radiation toward the sun and the rest of outer space; and all downwardly disposed surfaces should be polished metal.

Also, it should be understood, that the term "white" is not meant to refer to color as such, but is meant to refer generically that that heat emissive and absorptive quality of a surface which is a poor emitter and absorber of radiation from high temperature sources, in relation to its emission and absorption characteristics at lower or more moderate temperatures. In this regard, other factors besides color effect heat radiation emissive and absorptive characteristics (e.g. the roughness of the surface), so naturally "white" is not used in its more common connotation of describing mere "color." Also, the term "polished metal surface" is meant to refer to any surface (whether metal or not or polished or not) which is a poor emitter and absorber of radiation from both high, low or moderate temperature sources.

It should be understood that the foregoing is merely illustrative of a certain embodiment of the invention and many variations may be made by those skilled in the art without departing from the spirit and scope of the invention.

Now therefore, I claim:

1. A device for use in an environment such as that which exists at moon's surface, said device including a thermal control apparatus, said apparatus comprising:
- (a) a radiating member having an upwardly disposed white surface, means for operatively connecting said radiating member to said device in a manner to receive heat energy from said device at a relatively fast rate,
- (b) shield means having at least two operating positions with respect to said radiating member, a first of which positions is such that said white surface is exposed, and a second of which positions is such that said shield means covers said white surface so that said white surface is unexposed, said shield being swing mounted with respect to said radiating member,
- (c) temperature responsive control means to move said shield means relative to said radiating member to its first operating position during periods of more intense solar radiation and to move said shield means to its second operating position during periods of less intense solar radiation.

2. The apparatus as recited in claim 1, wherein heat transfer means is operatively connected to said device for providing a relatively high rate of heat transfer between said device and said control means.

3. The apparatus as recited in claim 2, wherein said heat transfer means comprises a cover for said control means, said cover having an outer surface exposed to exterior radiation and an inner surface directed toward said control means, said outer surface being characterized by its radiating and absorbing radiant energy at a slow rate as compared to said inner surface, said cover being so arranged that it hs a relatively fast rate of heat transfer between itself and said device.

4. The apparatus as recited in claim 3, wherein said control means has a surface which is directed toward said inner surface and is characterized by its radiating and absorbing radiant energy at a first rate.

5. The apparatus as recited in claim 4, wherein said control means comprises bimetal element means.

6. The apparatus as recited in claim 1, wherein said radiating member has a downwardly disposed polished metal surface.

7. In combination:
- (a) a device to operate in an environment such as that which exists at the moon's surface, said device having a substantial portion of its exposed surface area being of polished metal,
- (b) a radiating member having an upwardly disposed white surface, said radiating member having a heat conductive connection to said device, said radiating member being such that any downwardly directed exposed surface portion thereof is substantially of polished metal,
- (c) shield means having at least two operating positions with respect to said radiating member, a first of which positions is such that said white surface is exposed, and a second of which positions is such that said shield means covers said white surface so that said white surface is unexposed, said shield being swing mounted with respect to said radiating member,
- (d) temperature responsive control means to move said shield means relative to said operating member to its first operating position during periods of more intense radiation and to move said shield means to its second operating position during periods of less intense radiation.

8. The apparatus as recited in claim 7, wherein said radiating member comprises horizontally disposed plate means, which joins to said device along a substantial surface area so as to have a good heat conductive connection therewith.

9. An apparatus comprising, in combination:
- (a) a device to operate in an environment such as that which exists at the moon's surface, said device having a substantial portion of the exposed surface area thereof being of polished metal,
- (b) a substantially planar horizontally disposed plate member extending laterally from said device and joined thereto by a mounting flange contacting said device over a substantial area so that there is a good heat conductive connection between said member and said device, said member being comprised of a heat conductive material,
- (c) said member having a white upwardly directed surface area and a downwardly directed surface area of polished metal,
- (d) a generally planar shield having generally the same configuration as said radiating member and having substantially its entire surface being of polished metal, said shield being swing mounted along an axis proximate an edge portion of said radiating member,
- (e) temperature responsive control means operatively connected to said shield in a manner that during periods of low temperature, said shield swings to a position where it covers the upper surface of said radiating member so as to conceal said white surface, and during periods of high temperatures said shield swings away from said white surface so as to expose said white surface, and
- (f) cover means having an exposed polished metal surface and an inner surface of high emissivity and absorptivity of radiant heat, said cover means being so disposed as to protect said control means from direct solar radiation and having an operative connection to said device so that there is a relatively high rate of heat transfer therebetween.

10. The apparatus as recited in claim 9, where there are a pair of said radiating members extending laterally from said device in opposite directions therefrom, and there are likewise a pair of shields operatively positioned with a respective one of said radiating members, each yield having a respective temperature responsive control means associated therewith.

References Cited

UNITED STATES PATENTS

| | | | |
|---|---|---|---|
| 2,489,879 | 11/1949 | Grebe | 160—6 X |
| 2,914,915 | 12/1959 | Sziklas et al. | 165—133 X |
| 2,967,249 | 1/1961 | Quirk | 60—23 X |
| 3,089,840 | 5/1963 | Carter et al | 176—57 |
| 3,220,647 | 11/1965 | Riordan et al. | 236—1 |

ROBERT A. O'LEARY, *Primary Examiner.*

MEYER PERLIN, *Examiner.*

M. A. ANTONAKAS, *Assistant Examiner.*